US008166518B2

(12) United States Patent
Price et al.

(10) Patent No.: US 8,166,518 B2
(45) Date of Patent: Apr. 24, 2012

(54) SYSTEM AND METHOD PROVIDING SESSION AWARE REMOTE ACCESS

(75) Inventors: Michael Byron Price, Lawrence, KS (US); Marc A. Epard, Lawrence, KS (US); Donald W. Griffin, Lawrence, KS (US)

(73) Assignee: Netopia, Inc., Emeryville, CA (US)

( * ) Notice: Subject to any disclaimer, the term of this patent is extended or adjusted under 35 U.S.C. 154(b) by 964 days.

(21) Appl. No.: 11/560,309

(22) Filed: Nov. 15, 2006

(65) Prior Publication Data
US 2008/0114851 A1 May 15, 2008

(51) Int. Cl.
*H04L 29/06* (2006.01)
(52) U.S. Cl. ............ 726/2; 709/201; 709/202; 709/203; 709/208; 709/211; 709/217; 709/219; 709/227; 709/228; 709/229; 708/100; 708/102; 708/104; 708/107; 711/130; 711/147; 711/148
(58) Field of Classification Search .......... 709/201–203, 709/217–219, 227–229, 208–211; 726/2; 711/118, 130, 147–153; 718/100–108
See application file for complete search history.

(56) References Cited

U.S. PATENT DOCUMENTS

| 5,974,444 | A | * | 10/1999 | Konrad | 709/203 |
| 6,609,151 | B1 | * | 8/2003 | Khanna et al. | 709/222 |
| 6,807,666 | B1 | * | 10/2004 | Evans et al. | 718/108 |
| 7,293,270 | B1 | * | 11/2007 | Gupta et al. | 718/102 |
| 7,380,007 | B1 | * | 5/2008 | Bu et al. | 709/227 |
| 2003/0191799 | A1 | * | 10/2003 | Araujo et al. | 709/203 |

OTHER PUBLICATIONS

Master-Slave Computing on the Grid by Shao et al; Publisher: IEEE; Year: 2000.*

* cited by examiner

*Primary Examiner* — Taghi Arani
*Assistant Examiner* — Madhuri Herzog
(74) *Attorney, Agent, or Firm* — Stewart M. Wiener

(57) ABSTRACT

A computer implemented method provides remote access to a plurality of sessions at a computer. The method includes initiating a master process in a context independent from the sessions, establishing a first slave process in a context of a first session, and maintaining communication between the master process and the first slave process. The master process provides access to the computer's display while the display is under control of the first session, detects a second session, having a respective second slave process, communicates with the second slave process, and provides access to the computer's display while the display is under control of the second user session.

16 Claims, 9 Drawing Sheets

SYSTEM AND METHOD PROVIDING SESSION AWARE REMOTE ACCESS

TECHNICAL FIELD

The disclosed embodiments relate generally to computers and software. More particularly, the disclosed embodiments relate to methods, systems, user interfaces, and data structures for providing remote access to computing devices within a shared computing environment.

BACKGROUND

While applications providing remote access to computing devices are useful applications, such remote access applications do not adequately provide access in shared computing environments. The flow of information available at a remote access point may be interrupted when switching between sessions. It would be highly desirable if the flow of information to the remote access point was not interrupted when switching between sessions, thereby providing seamless remote access. In addition, it would be desirable for other remote access points to be able to seamlessly access the same session information. For a better understanding of the aforementioned aspects of the invention as well as additional aspects and embodiments thereof, reference should be made to the Detailed Description of Embodiments below, in conjunction with the following drawings, in which like reference numerals refer to corresponding parts throughout the figures.

SUMMARY

In accordance with some embodiments, a computer implemented method provides remote access to a plurality of sessions at a computer. The method includes initiating a master process in a context independent from the sessions, establishing a first slave process in a context of a first session, and maintaining communication between the master process and the first slave process. The master process provides access to the computer's display while the display is under control of the first session, detects a second session, having a respective second slave process, communicates with the second slave process, and provides access to the computer's display while the display is under control of the second user session.

In accordance with some embodiments, a system providing remote access to a plurality of sessions at a computer includes memory, one or more processors, and one or more programs stored in the memory and configured for execution by the processors. The programs include instructions for initiating a master process in a context independent from the sessions, establishing a first slave process in a context of a first session, and maintaining communication between the master process and the first slave process. The master process provides access to the computer's display while the display is under control of the first session, detects a second session having a respective second slave process, communicates with the second slave process, and provides access to the computer's display while the display is under control of the second user session.

In accordance with some embodiments, a computer program product for use in conjunction with a computer system includes a computer readable storage medium and a computer program mechanism embedded therein. The computer program mechanism comprises instructions for initiating a master process in a context independent from the sessions, establishing a first slave process in a context of a first session, and maintaining communication between the master process and the first slave process. The master process provides access to the computer's display while the display is under control of the first session, detects a second session having a respective second slave process, communicates with the second slave process, and provides access to computer's display while the display is under control of the second user session.

DETAILED DESCRIPTION OF EMBODIMENTS

Methods, systems, computer programs, and other aspects of the invention are described. Reference will be made to certain embodiments of the invention, examples of which are illustrated in the accompanying drawings. While the invention will be described in conjunction with the embodiments, it is not intended to limit the invention to these particular embodiments. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks well known to those of ordinary skill in the art are not described in detail to avoid obscuring aspects of the present invention.

Figure 1:
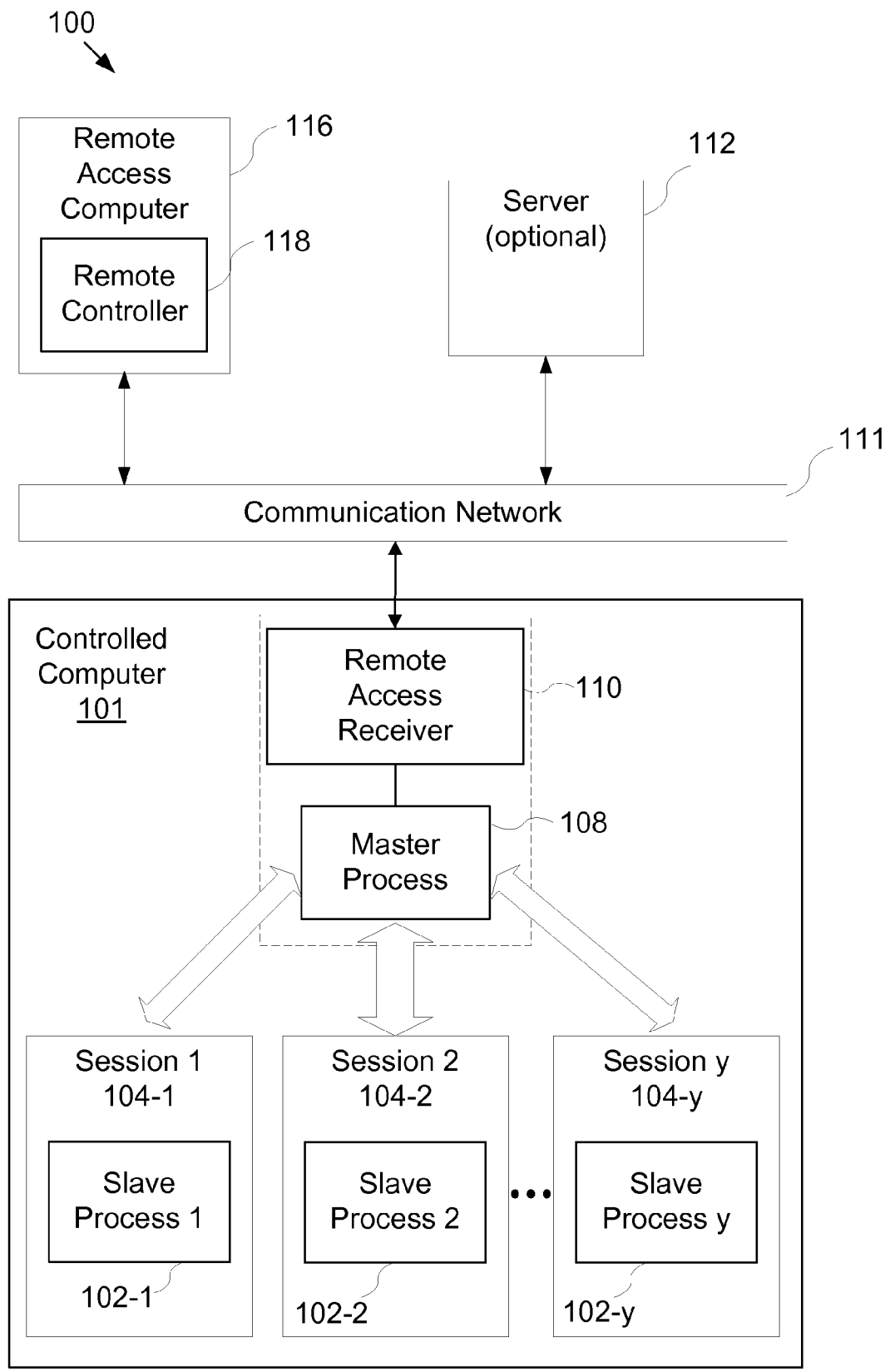
FIG. 1 is a block diagram illustrating an exemplary distributed computer system for implementing some embodiments disclosed herein.

FIG. 1 is a block diagram of a system 100 for implementing some embodiments disclosed herein. The system 100 may include a controlled computer 101 connected, via a communication network 111, to various devices, including one or more remote access computers 116, and, optionally, a server 112 for providing communications, database or other services. The term computer, as used throughout, may be refer to a number of devices, for example, a computer, an internet kiosk, a personal digital assistant, a cell phone, a desktop computer, or a laptop computer. The optional server 112 may be connected to the communication network 111 and may host at least one application that performs services and communicates via the communication network 111.

The controlled computer 101 may include a remote access receiver 110 connected to the communication network 111 for facilitating communication between the controlled computer 101 and the remote access computer 116. The remote access receiver 110 allows for the transfer of information between the controlled computer 101 and the communication network 111. The transferred information may be displayed on the remote access computer 116 for a remote user to review, modify, or otherwise interact with. Among other functions, the remote access receiver 110 may allow the remote access computer 116 to access the controlled computer's 101 display content, to detect actual or possible changes in the display content, and to provide input to the controlled computer 101. The master process 108 may be connected to the remote access receiver 110 to receive information from and transmit information to the remote access computer 116. As indicated in FIG. 1 by the dashed line box, the remote access receiver 110 and the master process 108 may be different functional aspects of an operating system process. The remote access receiver 110 and the master process 108 may be established in a context independent of any sessions 104 at the controlled computer 101 and may establish a slave process 102 in the context of each session 104. Alternatively, the slave processes 104 may be established independently of the remote access receiver 110 and master process 108 by the operating system of the controlled computer 101 or the like.

Multiple sessions 104-1, 104-2 through 104-$y$ may be established at the controlled computer 101. The letter y represents the number of sessions 104 established at the controlled computer 101 at any given time and may be any whole number. The sessions 104 may be user logins, desktops, accounts, environments, contexts, shells, workspaces or other means for providing a unique context for each user, separately and concurrently, on a controlled computer 101. Sessions 104 may be activated, deactivated, and re-activated using a "Fast User Switch" process or the like. A slave process 102-1, 102-2, through 102-$y$ corresponding to each session 104 runs in the context of each respective session. For example, slave process 102-1 runs in the context of session 104-1 as shown schematically in FIG. 1. The slave process 102-1 acts as a proxy for the master process 108 when session 104-1 is active, allowing the remote access computer 116 to access and control the controlled computer 101 while session 104-1 is active.

The communication network 111 may be a local area network (LAN), a metropolitan area network, a wide area network (WAN), such as an intranet, an extranet, or the Internet, or any combination of such networks. It is sufficient that the communication network 111 provides communication capability between the remote access computer 116 and the controlled computer 101. In some embodiments, the communication network 111 may be any communication channel between the remote controller 118 and the remote access receiver 110. In some embodiments, the communication network 111 uses HyperText Transport Protocol (HTTP) and the Transmission Control Protocol/Internet Protocol (TCP/IP) to transport information between computers. The HTTP permits a computer to access various resources available via the communication network 111. The various embodiments of the invention, however, are not limited to the use of any particular protocol. The term "resource" as used throughout this specification refers to any document, object, information item, set of information, web-based application or service that is accessible via a Uniform Resource Locator (URL) and can be, for example, a web page, a text or word processing document, an email message, a voice message, a database, an image, or a computational object.

One or more remote access computers 116 may also be connected to the communication network 111. The remote access computer 116 may be any of a number of devices (for example, a computer, an internet kiosk, a personal digital assistant, a cell phone, a desktop computer, or a laptop computer) and can include a remote controller 118 that permits a user to access a controlled computer 101. In some embodiments, the remote access computer 116 may be the same physical computer as the controlled computer 101. For example, a remote controller running on controlled computer 101 may record the display contents of the controlled computer 101 onto memory at the controlled computer 101.

The remote controller 118 may operate within a client application, such as a software application that permits a user to interact with the remote access computer 116 and/or network resources to perform one or more tasks. For example, the client application may be a web browser (for example, the computer programs available under the trademarks Firefox®, Internet Explorer® or Safari™) or other application that permits a user to search for, browse, and/or use resources, such as one or more web pages, on the remote access computer 116 and/or accessible via the communication network 111. Various other applications and databases may also reside on both the remote access computer 116 and the controlled computer 101.

Figure 2:
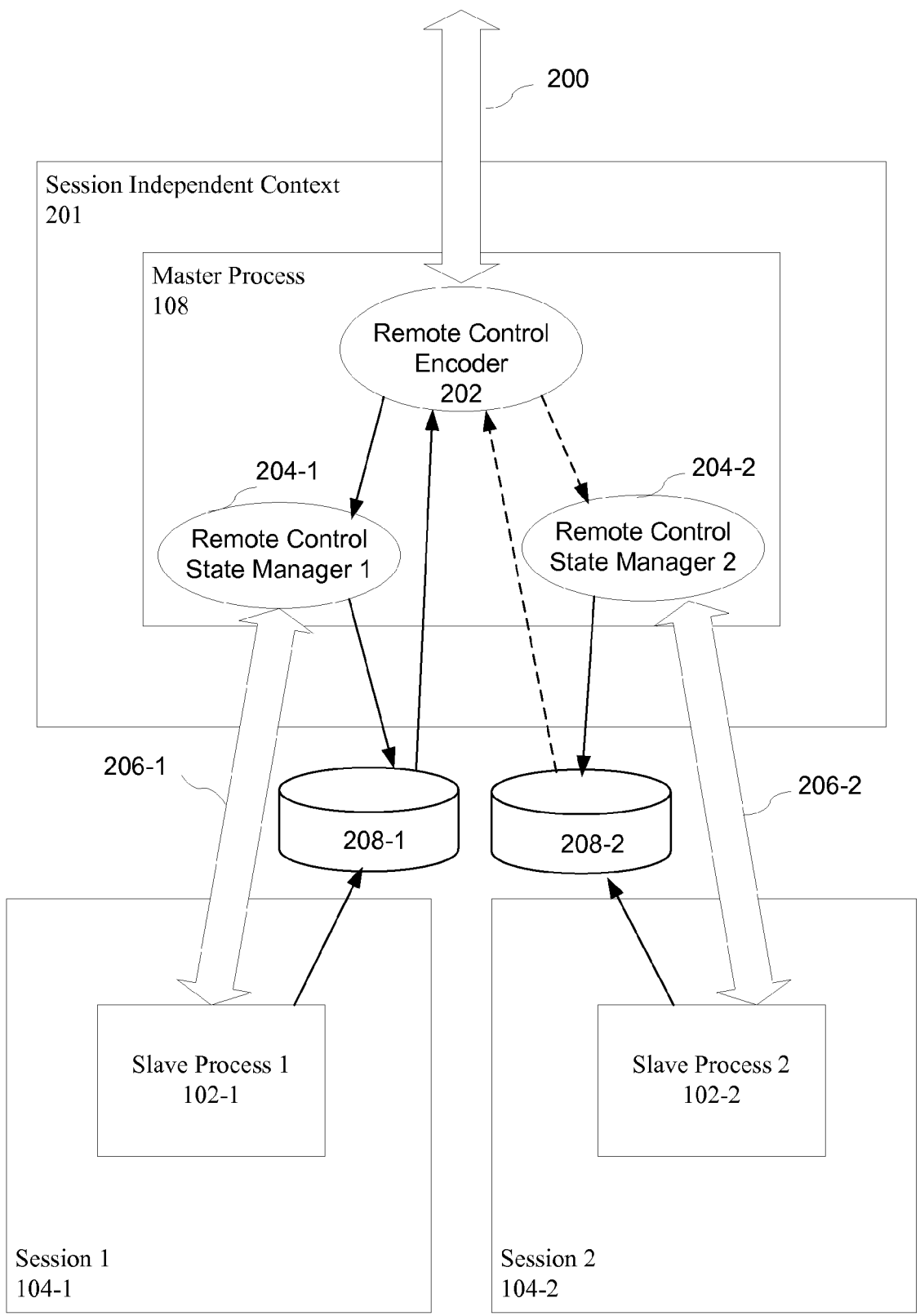
FIG. 2 is a block diagram illustrating relationships between elements described herein.

The system 100 allows a remote access computer 116 to seamlessly access and/or control a controlled computer 101 when switching between sessions 104. In particular, as shown in FIG. 2, information from the remote controller 118 can be transferred between the remote access receiver 110 and sessions 104 in a session independent context 201 using the master process 108.

The master process 108 may comprise, for example, a Windows® service, a Unix® daemon process, a process created by the operating system of the computer to handle network connections, or the like. The master process 108 has a remote control encoder 202 that encodes and compresses data for transmission on a remote control data channel 200 between the remote controller 118 and the remote access receiver 110. The remote control encoder 202 may also decode and decompress data for communication to slave processes 102. The remote control data channel 200 transmits commands and data over the communication network 111 between the remote controller 118 and the remote access receiver 110.

The master process 108 communicates with the slave processes 102. The master process may include a remote control state manager 204, an inter-process communication mechanism 206 and shared memory 208. The manager 204 may use the inter-process communication mechanism 206 to transmit information between the master process 108 and the slave process 102. In some embodiments, the communication mechanism 206 may be replicated for each slave process 102, as shown in FIG. 2. For example, the master process 108 may transmit requests to the slave process 102-1 and the slave process 102-1 may send notifications to the master process 108 via the communication mechanism 206-1. The communication mechanism 206 may be specific to the type of computing device on which the master process 108 is established or the operating system thereof. For example, different communication mechanisms may be used on a desktop computer running a Windows® operating system, a personal digital assistant, and a desktop computer running a Unix® operating system.

In some embodiments, the master process 108 may have a remote control state manager 204 corresponding to each slave process 102. Each remote control state manager 204-1 and 204-2 may use its own communication mechanism 206-1 and 206-2, respectively, as shown in FIG. 2, or share a single communication mechanism. For example, when the master process 108 detects a new session 104-2, the master process may establish a new remote control state manager 204-2 with a new communication mechanism 206-2 to communicate with the corresponding new slave process 102-2 and switch the remote control encoder 202 from using the new remote control state manager 204-1 to the new manager 204-2, as indicated in FIG. 2 by the dashed lines. When switching to using the new remote control state manager 204-2, the master process 108 may close the previous remote control manager 204-1 or store the manager 204-1 in a cache. If the first session 104-1 is re-activated, the master process 108 will then switch back to using the remote control manager 204-1, whether by finding the manager 204-1 in the cache or by re-establishing a remote control state manager corresponding to session 104-1.

The master process 108 may also configure shared memory 208 for use by both the master process 108 and the slave process 102 to provide more rapid access to selected data, such as display content or screen captures of the controlled computer 101 or the like. In some embodiments, the remote control state manager 204 configures the shared memory 208. The master process 108 may configure shared memory 208-1 for use by the remote control state manager 204-1 and the slave process 102-1 and configure shared memory 208-2 for use by remote control state manager 204-2 and slave process 102-2. In some embodiments the shared memory 208 may be accessed by all slave processes 102 and remote control managers 204. As shown in FIG. 2, the slave process 102 may store data, such as display content for the corresponding session, in shared memory 208. The remote control encoder 202 may then read the data directly from the stored memory corresponding to the current active session.

Figure 3A:
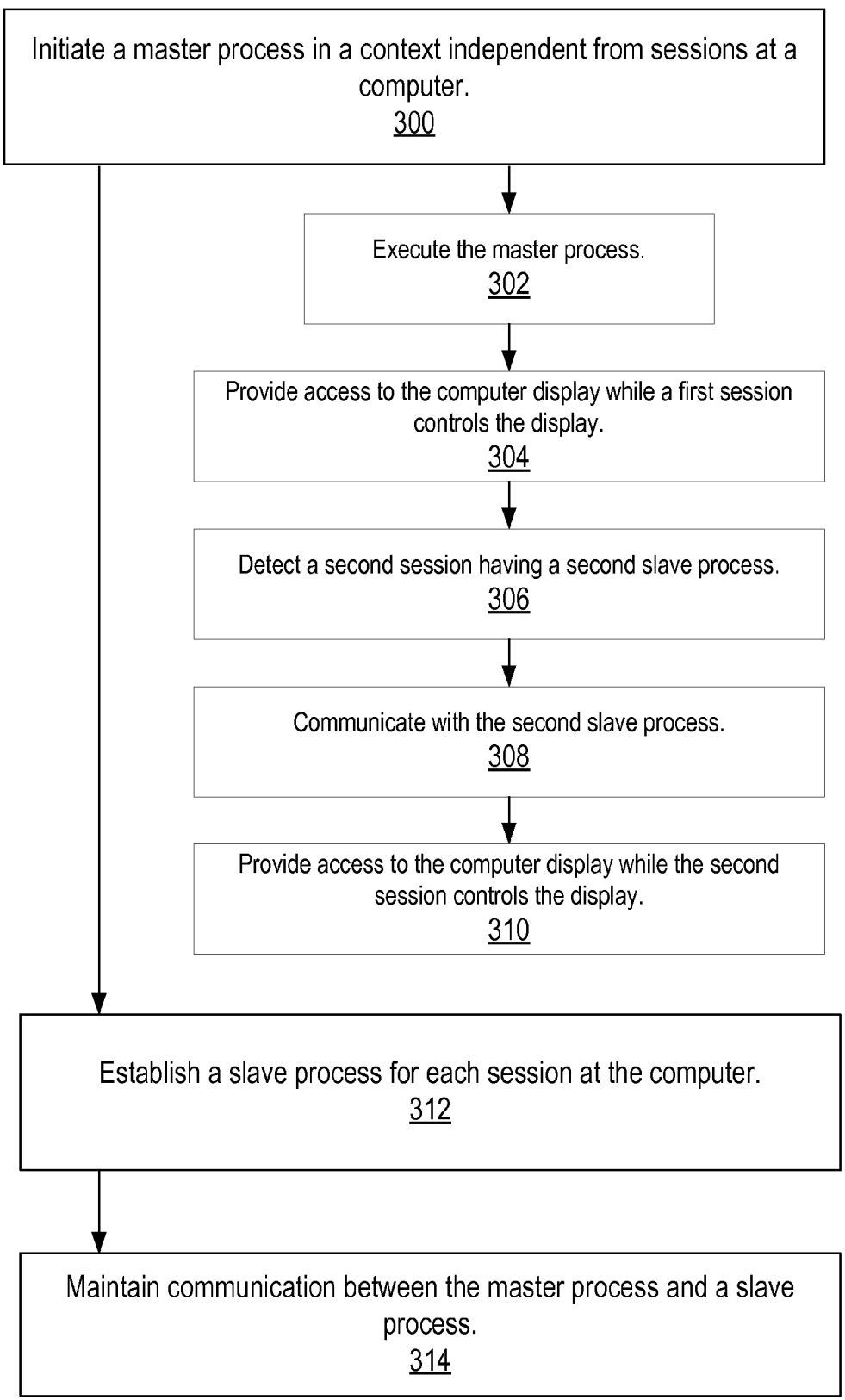
FIG. 3A is a flow chart illustrating an exemplary method.
Figure 3B:
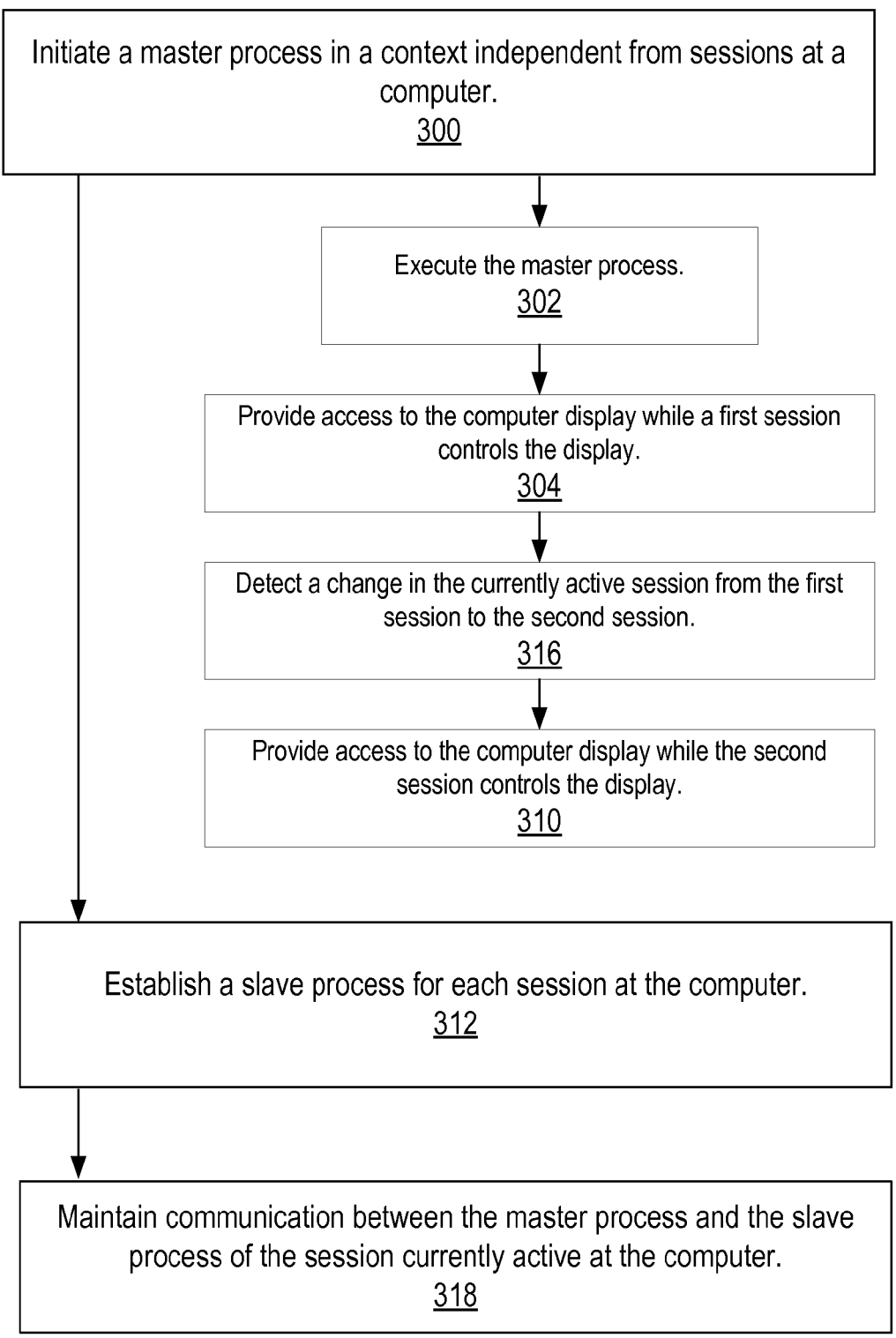
FIG. 3B is a flow chart illustrating a second exemplary method.
Figure 3C:
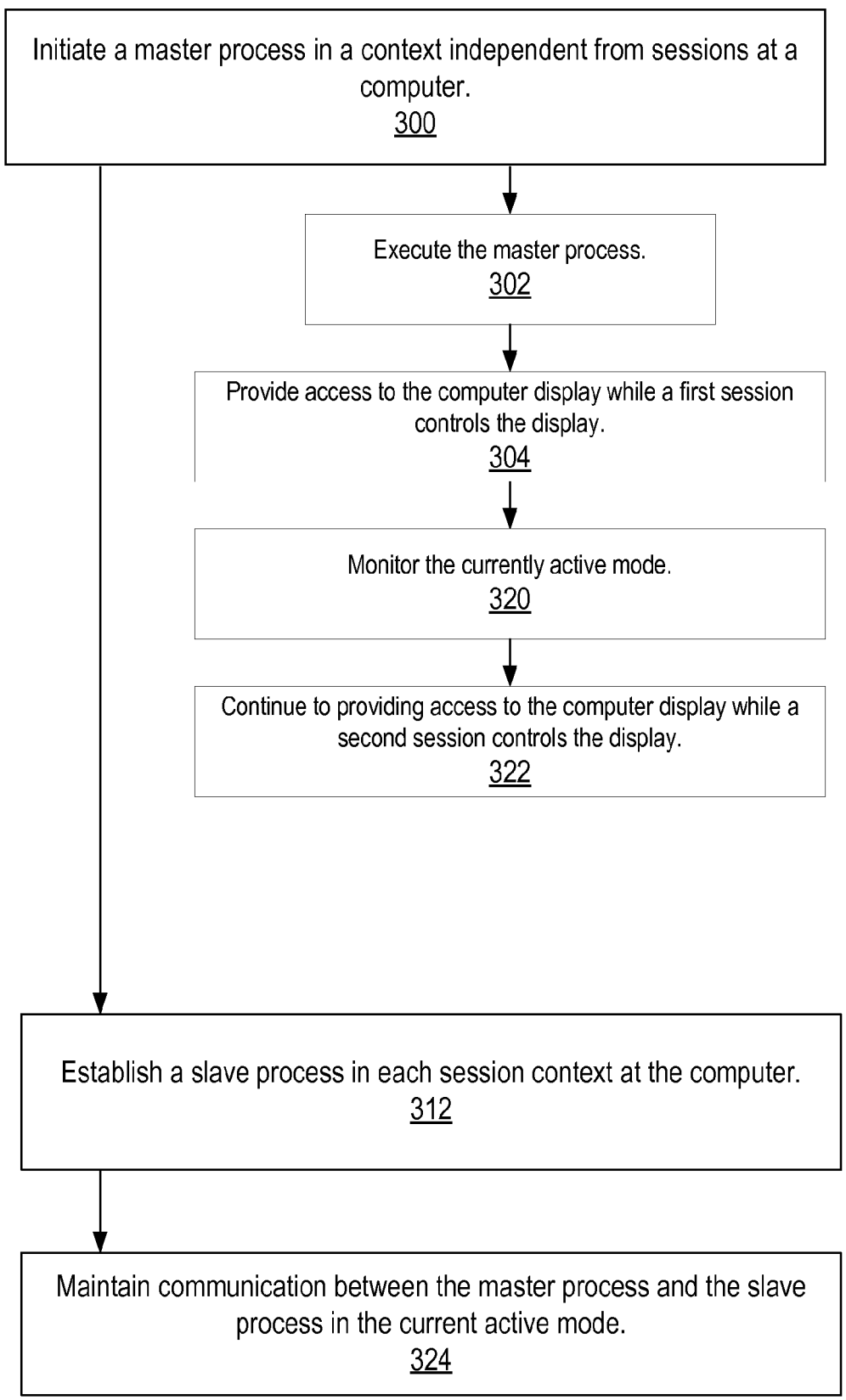
FIG. 3C is a flow chart illustrating a third exemplary method.
Figure 3D:
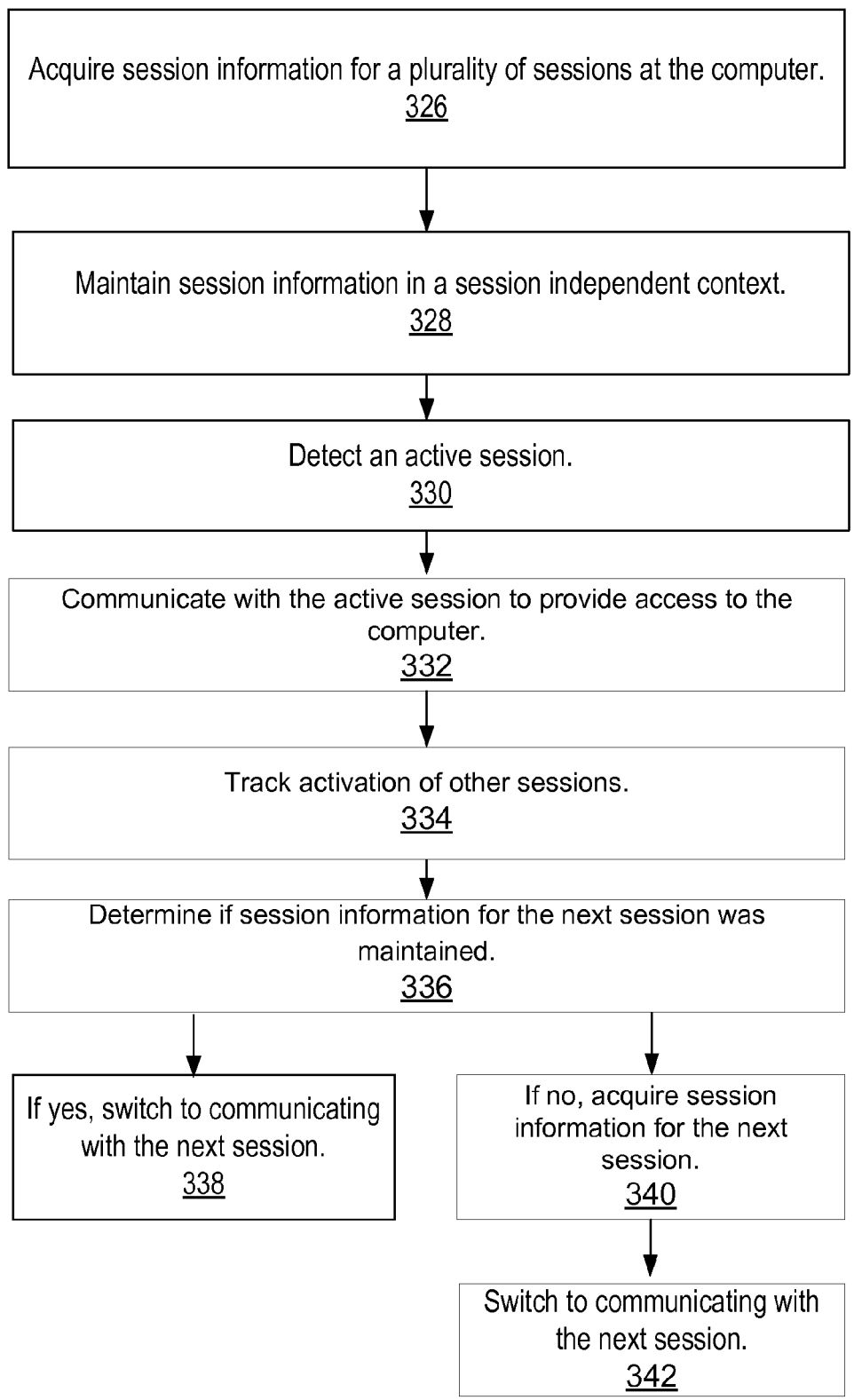
FIG. 3D is a flow chart illustrating a fourth exemplary method.
Figure 3E:
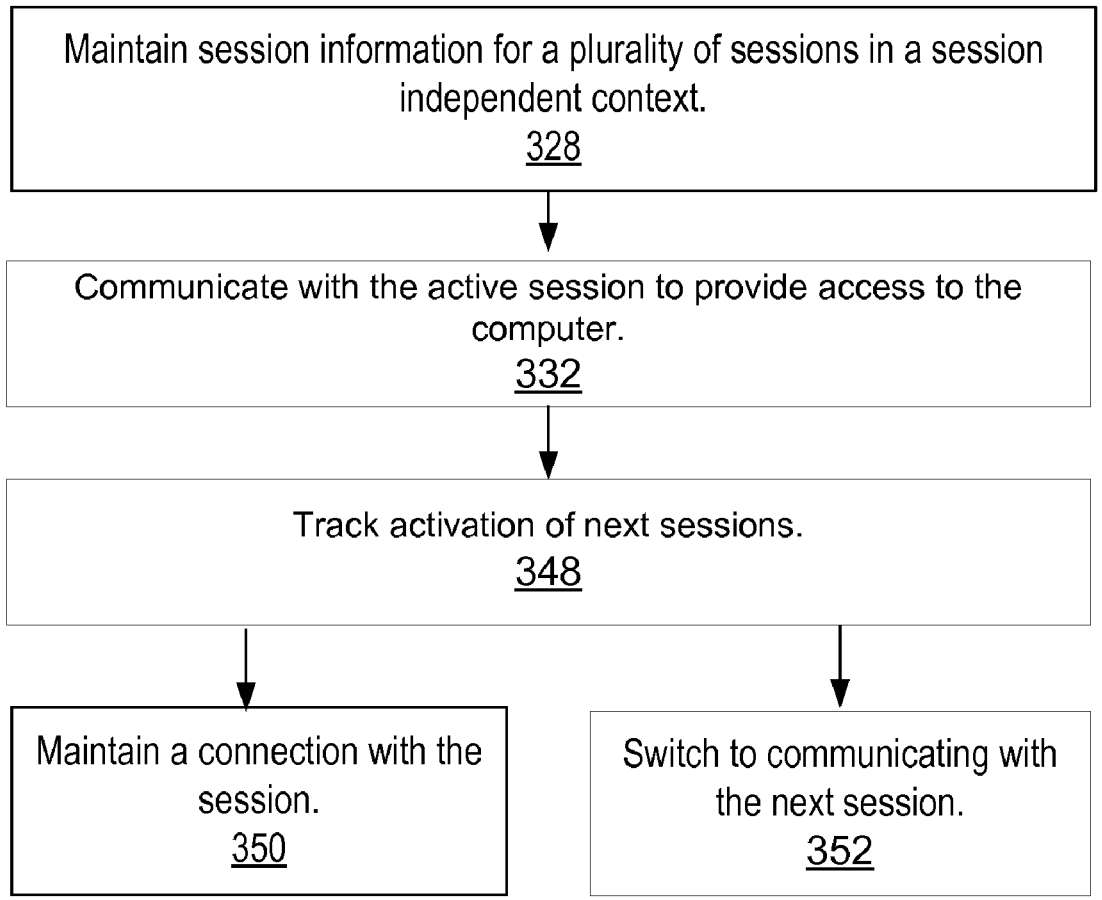
FIG. 3E is a flow chart illustrating a fifth exemplary method.

FIGS. 3A, 3B, 3C, 3D, and 3E are flowcharts representing computer implemented methods according to various embodiments. The computer implemented method may be executed any number of times. FIGS. 3A, 3B and 3C show processes performed by the system 100 or the like. FIGS. 3D and 3E show processes that may be performed by system 100 or a similar system for remote access to a shared computer having multiple sessions.

FIG. 3A is a flow chart representing a computer implemented method according to some embodiments. FIG. 3A shows that the computer implemented method initiates a master process in a context independent from sessions at a computer 300. In some embodiments the master process may be initiated at computer startup. In other embodiments, the master process may be initiated when network connections are established. In some embodiments, the computer implemented method then establishes a slave process for each session at the computer 312, maintains communication between the master process and a slave process 314, and executes the master process 302 to perform additional steps. A slave process may be established for each session at the computer as the session is initiated 312. In some embodiments the slave process may be injected into the context of each new session as it is activated by the master process, while in others the computer implemented process may inject the slave process into the session context by other means. Once the master process and at least one slave process are established, the computer implemented method maintains communication between the master process and the slave process 314 for the session in control of the display of the controlled computer 101.

The master process provides access to the computer display while a first session controls the display 304. In some embodiments, the master process communicates with a first slave process running in the first session context. The master process may also provide input to the controlled computer from a remote source, such as the remote access computer 116 of system 100. The master session also detects additional sessions when those sessions become active, including detecting a second session having a second slave process 306 and communicates with the second slave process 308. In some embodiments, the master process communicates with the slave processes using shared memory. Then, the master process provides access to the computer display (of the controlled computer 101) while the second session controls the display 310. In some embodiments, the master process automatically (without user intervention) detects session activations (e.g., changes in the currently active session) and automatically provides access to the computer display of the controlled computer 101 by communicating with the slave process in the context of the session in control of the display.

In some embodiments, as shown in FIG. 3B, the computer implemented method initiates a master process in a context independent from sessions at a computer 300. In some embodiments the master process may be initiated at computer startup. In other embodiments, the master process may be initiated when network connections are established. In some embodiments, the computer implemented method then establishes a slave process for each session at the computer 312, maintains communication between the master process and the slave process of the session currently active at the computer 318, and executes the master process 302 to perform additional steps. A slave process may be established for each session at the computer as the session is initiated 312. In some embodiments the slave process may be injected into the context of each new session as it is activated by the master process, while in others the computer implemented process may inject the slave process into the session context by other means. Once the master process and at least one slave process are established, the computer implemented method maintains communication between the master process and the slave process 314 of the currently active session 318.

The master process provides access to the computer display while a first session controls the display 304. In some embodiments, the master process communicates with a first slave process running in the first session context. The master process may also provide input to the computer from a remote source, such as the remote access computer 116 of system 100. The master session also detects a change in the currently active session from the first session to the second session 316. Then, the master process may provide access to the computer display while the second session controls the display 310. In some embodiments, the master process provides access to the computer display while the currently active (second) session controls the display. The master process detects changes in the currently active session and provides access to the computer display while each session is in control of the display. In some embodiments, the master process automatically (without user intervention) detects a change in the user session, and automatically provides uninterrupted access to the display of the computer when there is a change in the currently active session. In some embodiments, the master session may detect any change in the currently active session, such as from the second session to a third session, back to the first session, or the like. In some embodiments, the slave processes communicate session information to the master process.

In some embodiments, as shown in FIG. 3C, the computer implemented method initiates a master process in a context independent from sessions at a computer 300, as described above. In some embodiments, the computer implemented method then establishes a slave process for each session at the computer 312, maintains communication between the master process and the slave process in the currently active mode 324, and executes the master process 302 to perform additional operations. The master process provides access to the computer display while a first session controls the display 304, monitors the currently active mode 320 by detecting changes from one session to another, and continues to provide access to the computer display while a second session controls the display 322. The master process may also switch (e.g., from communicating with one slave process to another) to provide access to the display any time the slave process in the current active mode changes.

In some embodiments, as shown in FIG. 3D, the computer implemented method acquires session information for a plurality of sessions at a computer 326. The computer implemented method then maintains the session information in a session independent context 328, detects an active session 330, and communicates with the active session to provide access to the computer 332. The computer implemented method also tracks activation of other sessions 334 and determines whether session information for the next session activated was maintained 336. If session information for the newly active session was maintained in a session independent context, the computer implemented method switches to communicating with the next session 338. Otherwise, the computer implemented method acquires session information for the newly activated session 340 and then switches to communicating with the next session 342.

In some embodiments, as shown in FIG. 3E, the computer implemented method maintains the session information for a plurality of sessions in a session independent context 328 and communicates with the active session to provide access to the computer 332. The computer implemented method also tracks activation of next sessions 348 and either maintains a connection with the current session 350 (if no new session activation has been detected) or switches to communicating with the next session 352.

Figure 4:
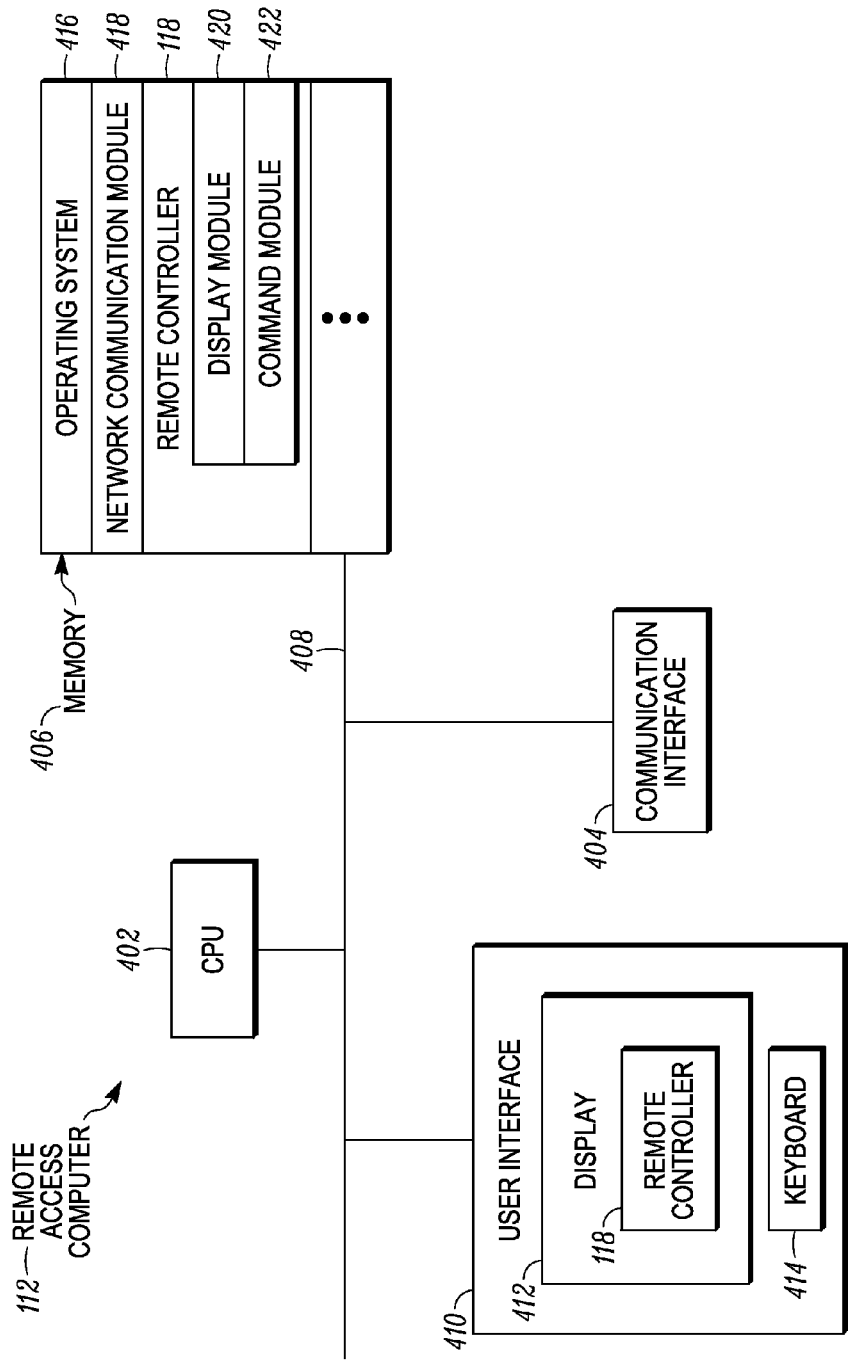
FIG. 4 is a block diagram illustrating an exemplary controlling computer.

FIG. 4 is a block diagram of an exemplary remote access computer 116 in accordance with some embodiments of the present invention. As noted above, in some embodiments, the remote access computer 116 and the controlled computer 101 are the same device. The remote access computer 116 typically includes one or more processing units (CPUs) 402, one or more network or other communications interfaces 404, memory 406, and one or more communication buses 408 for interconnecting these components. The communication buses 408 may include circuitry (sometimes called a chipset) that interconnects and controls communications between system components. The remote access computer 116 optionally may include a user interface 410 comprising a display 412 and a keyboard 414. Memory 406 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 406 may optionally include one or more storage devices remotely located from the CPU(s) 402. In some embodiments, memory 406 stores the following programs, modules and data structures, or a subset thereof:

- an operating system 416 that includes procedures for handling various basic system services and for performing hardware dependent tasks;
- a network communication module 418 that is used for connecting the remote access computer 116 to other computers via the one or more communication network interfaces 404 and one or more communication networks, such as the Internet, other wide area networks, local area networks, metropolitan area networks, and the like; and
- a remote controller 118 that can access another computer.

In some embodiments, the remote controller 118 may include a display module 420 and a command module 422. The display module 420 provides access to the display of a computer, such as display 512 of the controlled computer 101. In some embodiments, the display module 420 receives information about changes in the display 512 and reassembles the image (or the portion of the image controlled by the currently active slave process) on the display 512 of the controlled computer. The command module 422 allows the remote control computer 116 to provide input to a computer. For example, the user of the remote control computer 116 may provide input via the keyboard 414 to the controlled computer 101.

In some embodiments, the remote controller 118 is a computer program product for use in conjunction with a computer system, where the computer program product includes a computer readable storage medium and a computer program mechanism embedded therein. The computer program mechanism comprises instructions for initiating a master process in a context independent from the sessions, establishing a first slave process in a context of a first session, and maintaining communication between the master process and the first slave process.

Figure 5:
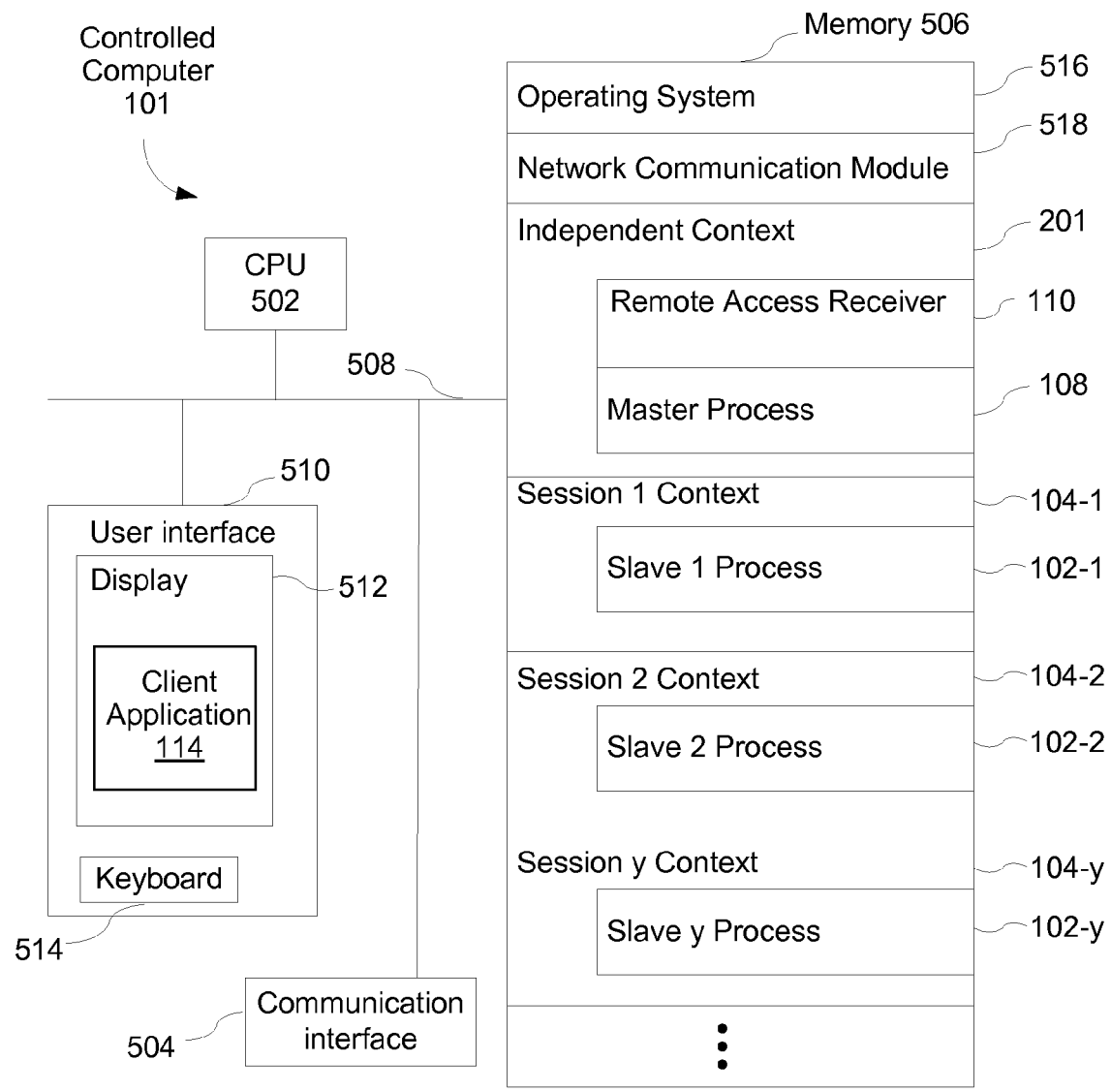
FIG. 5 is a block diagrams illustrating an exemplary controlled computer.

FIG. 5 is a block diagram of an exemplary controlled computer 101 in accordance with some embodiments of the present invention. The server system 101 typically includes one or more processing units (CPUs) 502, one or more network or other communication interfaces 504, memory 506, and one or more communication buses 508 for interconnecting these components. The communication buses 508 may include circuitry (sometimes called a chipset) that interconnects and controls communications between system components. The controlled computer 101 may include a user interface 510. Memory 506 includes high-speed random access memory, such as DRAM, SRAM, DDR RAM or other random access solid state storage devices; and may include non-volatile memory, such as one or more magnetic disk storage devices, optical disk storage devices, flash memory devices, or other non-volatile solid state storage devices. Memory 506 optionally includes one or more storage devices remotely located from the CPU(s) 502. In some embodiments, memory 506 stores the following programs, modules, and data structures, or a subset thereof:

- an operating system 516 that includes procedures for handling various basic system services and for performing hardware dependent tasks;
- a network communication module 518 that is used for connecting the controlled computer 101 to other computers via the one or more communication network interfaces 504 and one or more communication networks, such as the Internet, other wide area networks, local area networks, metropolitan area networks, and so on;
- a remote access receiver 110;
- a master process 108 in an independent context 201;
- a first slave process 102-1 in the context 104-1;
- a second slave process 102-2 in the context 104-2; and so forth, through
- a y-th slave process 102-y in the context 104-y.

The operating system 516 may provide for a "Fast User Switch" process to initiate and switch between sessions 104. In some embodiments, the operating system 516 may establish the master process 108 and the remote access receiver 110 in an independent context 201 and the slave processes 102 within the session contexts 104.

The network communication module 518 facilitates communication between the controlled computer 101 and the communication network 111. The network communication module 518 may allow for the transfer of information from the controlled computer 101 to the communication network 111 providing access for the remote controller 118 in embodiments where the remote access computer 116 and the controlled computer 101 are separate devices.

The remote access receiver 110 may allow the remote access computer 116 to access the controlled computer's 101 display content, to detect actual or possible changes in the display content, and to provide input to the controlled computer 101. The master process 108 may be connected to the remote access receiver 110 to receive information from and transmit information to the remote access computer 116.

Multiple sessions 104-1, 104-2 through 104-y may be established at the controlled computer 101. The sessions 104 may be user logins, desktops, accounts, environments, contexts, shells, workspaces or other means for providing a unique context for each user, separately and concurrently on a controlled computer 101. A slave process 102-1, 102-2, through 102-y corresponding to each session 104 runs in the context of each respective session. The slave process 102-1 acts as a proxy for the master process 108 when session 104-1 is active, allowing the remote access computer 116 to access and control display and input on the controlled computer 101.

Each of the above identified elements in FIGS. 4 and 5 may be stored in one or more of the previously mentioned memory devices, and corresponds to a set of instructions for performing a function described above. The above-identified modules or programs (i.e., sets of instructions) need not be implemented as separate software programs, procedures or modules, and thus various subsets of these modules may be combined or otherwise rearranged in various embodiments. In some embodiments, memory 406 and 506 may store a subset of the modules and data structures identified above. Furthermore memory 406 and 506 may store additional modules and data structures not described above.

Although FIGS. 4 and 5 show respectively a remote access computer 116 and a controlled computer 101, the figures are intended more as functional descriptions of the various features which may be present in a remote access system than as a structural schematic of the embodiments therein. In practice, and as recognized by those of ordinary skill in the art, items shown separately could be combined and some items could be separated. For example, some items shown separately in FIG. 5 could be implemented on a single controlled computer and single items could be implemented by one or more controlled computers. The actual number of controlled computers and how features are allocated among them will vary from one implementation to another.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of providing remote access to a plurality of sessions at a computer, comprising:
at the computer:
initiating a master process in a context independent from the sessions;
establishing a first slave process and a first remote control state manager in a context of a first session, wherein the first slave process acts as a proxy for the master process when the first session is active;
maintaining communication between the master process and the first slave process using the first remote control state manager;
the master process:
providing access to a display of the computer while the display is under control of the first session;
automatically detecting a change from the first session to a second session without user intervention, wherein the second session has a respective second slave process, wherein the second slave process acts as a proxy for the master process when the second session is active, further wherein the master process establishes a second remote control state manager corresponding to the second slave process;
communicating with the second slave process using the second remote control state manager; and
providing access to the display of the computer while the display is under control of the second user session, wherein the master process configures a plurality of areas of a memory which includes display content such that each area of the plurality of areas is accessible by a remote control state manager and a corresponding slave process.

2. The method of claim 1, wherein providing access includes providing input to the computer from a remote source, remotely located from the computer.

3. The method of claim 2, wherein providing input to the computer includes providing the input to a respective slave process via the master process.

4. The method of claim 1, wherein providing access to the display of the computer while the display is under control of the first session includes accessing memory shared by the master process and the first slave process.

5. The method of claim 1, wherein providing access to the display of the computer while the display is under control of the second session includes accessing memory shared by the master process and the second slave process.

6. A method of providing remote access to a plurality of sessions at a computer, comprising:
at the computer:
initiating a master process in a context independent from the plurality of sessions;
establishing a respective slave process and a respective remote control state manager in a context of each respective session;
maintaining communication between the master process and the slave process of a respective session of the plurality of sessions currently active at the computer using the respective remote control state manager, wherein the slave process acts as a proxy for the master process when the respective session is active;
the master process:
providing access to a display of the computer while the display is under control of a first respective session;
automatically detecting a change in the currently active session from the first respective session to a second respective session without user intervention; and
automatically providing access to the display of the computer while the display is under control of the second respective session, wherein the master process configures a plurality of areas of a memory which includes a display content such that each area of the plurality of areas is accessible by the respective remote control state manager and the respective slave process.

7. The method of claim 6, further including the master process detecting a change in the currently active session from the second respective session to the first respective session; and providing access to the display of the computer while the display is under control of the first respective session.

8. The method of claim 6, wherein the master process detects a switch from the second respective session to a third respective session in the current active mode; and provides access to the display of the computer while the display is under control of the third respective session.

9. The method of claim 6, wherein detecting the change in the currently active user session is accomplished by the master process without user intervention.

10. The method of claim 6, wherein the master process provides uninterrupted access to the display of the computer.

11. The method of claim 6, wherein the respective slave process communicates respective session information to the master process.

12. The method of claim 6, wherein an operating system of the computer establishes at least one of the respective slave processes in the context of each respective session.

13. The method of claim 6, wherein the master process establishes at least one of the respective slave processes in the context of each respective session.

14. The method of claim 6, wherein maintaining communication between the master process and the respective slave process includes using shared memory.

15. A method of providing remote access to a plurality of sessions at a computer, comprising:

maintaining session information for the plurality of sessions in a context independent from the plurality of sessions, wherein a master process is initiated in a context independent from the plurality of sessions, further wherein a respective slave process and a respective remote control state manager are established in a context of each respective session;

a master process:

communicating with an active session of the plurality of sessions using a remote control state manager to provide access to a display of the computer;

detecting an activation of a next session of the plurality of sessions automatically and without user intervention;

determining if session information for the next session was maintained;

if session information for the next session was maintained, switching to communicating with the next session to provide access to the display of the computer; and if session information for the next session was not maintained, acquiring session information for the next session and switching to communicating with the next session to provide access to the display of the computer, wherein the master process configures a plurality of areas of a memory which includes a display content such that each area of the plurality of areas is accessible by the respective remote control state manager and the respective slave process.

16. The method of claim 15, further comprising:

acquiring session information for the plurality of sessions; and detecting an active session of the plurality of sessions.

* * * * *